(12) United States Patent
Grover

(10) Patent No.: US 6,729,517 B2
(45) Date of Patent: May 4, 2004

(54) CLAMPING APPARATUS

(76) Inventor: Ralph Ernest Grover, 2686 Elden Ave., Costa Mesa, CA (US) 92627

(*) Notice: Subject to any disclaimer, the term of this patent is extended or adjusted under 35 U.S.C. 154(b) by 47 days.

(21) Appl. No.: 10/237,227

(22) Filed: Sep. 4, 2002

(65) Prior Publication Data

US 2003/0015560 A1 Jan. 23, 2003

Related U.S. Application Data

(63) Continuation-in-part of application No. 09/729,903, filed on Dec. 4, 2000, now Pat. No. 6,497,352.

(51) Int. Cl.[7] .............................................. A45C 15/00
(52) U.S. Cl. .................. 224/575; 224/195; 224/666; 224/673; 224/678; 224/230; 224/241; 224/242; 224/904; 224/930
(58) Field of Search ................................ 224/575, 182, 224/666, 673, 678, 230, 235, 241, 242, 245, 247, 248, 268, 904, 930

(56) References Cited

U.S. PATENT DOCUMENTS

| | | | |
|---|---|---|---|
| 984,402 A | | 2/1911 | Tuttle |
| 1,706,953 A | * | 3/1929 | Bush, Sr. ........................ 24/3.9 |
| 1,719,870 A | * | 7/1929 | Burton ........................... 24/3.5 |
| 1,786,254 A | * | 12/1930 | Meehan ....................... 224/222 |
| 2,846,129 A | * | 8/1958 | O'Brien ....................... 224/248 |
| 3,168,971 A | * | 2/1965 | Goertzen ..................... 224/247 |
| 3,450,317 A | | 6/1969 | Ramer |
| 3,828,990 A | * | 8/1974 | Baldocchi ................... 224/193 |
| 4,113,156 A | * | 9/1978 | Brito ........................... 224/666 |
| 4,123,029 A | | 10/1978 | Gillotti |
| 4,372,468 A | | 2/1983 | Harvey |
| 4,609,326 A | | 9/1986 | Roesler |
| 4,677,362 A | * | 6/1987 | House, II et al. ............ 320/115 |
| 4,896,806 A | * | 1/1990 | Sanchez, Jr. ................. 224/242 |
| 4,917,281 A | * | 4/1990 | Ostermiller .................. 224/661 |
| 4,951,857 A | * | 8/1990 | Carr ............................. 224/230 |
| 4,974,764 A | * | 12/1990 | Cantwell ..................... 224/269 |
| 5,195,667 A | | 3/1993 | Gallant |
| 5,452,830 A | | 9/1995 | Hopkins et al. |
| 5,573,167 A | | 11/1996 | Bebb et al. |
| 5,611,471 A | * | 3/1997 | French ........................ 224/243 |
| 5,820,333 A | | 10/1998 | Hong |
| 5,857,600 A | * | 1/1999 | Akutsu ....................... 224/240 |
| 5,890,638 A | * | 4/1999 | Woloshen .................... 224/247 |
| 5,944,242 A | | 8/1999 | Musarella et al. |
| 6,102,264 A | * | 8/2000 | Redzisz ....................... 224/197 |

* cited by examiner

*Primary Examiner*—Stephen K. Cronin
(74) *Attorney, Agent, or Firm*—Gene Scott-Patent Law & Venture Group

(57) ABSTRACT

A clamping apparatus comprises a base plate and integral thereto, a fixed clamping jaw and a pivotal support. A movable clamping jaw opposes the fixed clamping jaw and is pivotally engaged with the pivotal support, thereby being rotatable between an open jaw attitude and a closed jaw attitude. A motion inhibitor prevents a workpiece from pressing against the movable clamping jaw. An actuation lever enables moving the movable clamping jaw from the closed jaw attitude to the open jaw attitude and an actuation finger is positioned for receiving contact with the workpiece for moving the movable clamping jaw from the open jaw attitude to the closed jaw attitude. A bias spring is engaged with the movable clamping jaw and enabled for inhibiting motion of the movable clamping jaw from both the open and closed jaw attitudes.

9 Claims, 2 Drawing Sheets

CLAMPING APPARATUS

RELATED APPLICATIONS

The present application is a continuation-in-part application of a previously filed utility patent application having Ser. No. 09/729,903 and filing date of Dec. 4, 2000, which is allowed and now U.S. Pat. No. 6,497,352.

INCORPORATION BY REFERENCE

Applicant(s) hereby incorporate herein by reference, any and all U.S. patents, U.S. patent applications, and other documents and printed matter cited or referred to in this application.

BACKGROUND OF THE INVENTION

1. Field of the Invention

This invention relates generally to clamping devices, and more particularly to such a device with automatically-locking action upon placing a workpiece within the clamp and further providing simultaneous manual release and gripping of the workpiece.

2. Description of Related Art

The following art defines the present state of this field:

Tuttle, et. al. U.S. Pat. No. 984,402 describes a carrying device comprising a frame having portions formed to provide garment-engaging spurs, a follower supported by the frame, and a stop supported by the frame and having portions engaged with the said garment-engaging spurs.

Ramer et. al. U.S. Pat. No. 3,450,317 describes a tool holder for headed tools to be carried on the belt of a person. The holder consists of a plastic member having a portion for suspending from the belt, and including a bifurcated, semi-circular portion extending from the belt holding portion. A two part locking member has one portion in the form of a square-shaped tab, which is secured at one end to the plastic member at the juncture of the belt portion and the bifurcated portion. The other end of the tab member has secured thereto to a second semicircular member, forming the other part of the locking member, the second semi-circular member being movable with the tab portion. The second semi-circular member receives the head of a tool and rotates along the plastic member, with the tab, allowing the handle of the tool to extend between the bifurcated portion with the second semi-circular member wrapping over the head of the tool, securely locking the tool in the holder.

Gillotti, et al. U.S. Pat. No. 4,123,029 describes a stand for holding a book in an open, upright position on a horizontal surface, consisting of a face place, held at a rearwardly inclined position by a rear mounted triangular support plate, and a book resting shelf located on the lower front side of the face plate. The book is held in an open position by two page gripping asssemblies at the book resting shelf level, including two page gripping brackets, connected to spring loaded rods, which grip the open book pages from below, holding the open pages against the face plate. The gripping assembly tension is adjusted by wing nuts at the ends of both rods.

Harvey et al. U.S. Pat. No. 4,372,468 describes a snap-lock device for securing and pivotally supporting a hammer or other similar tool from the user's waist belt. The device is comprised of a pad support which is suspended from the waist belt, an open ended tool support which is pivotally mounted on the pad for carrying the tool,, and a pair of spring biased tool retention gates which are mounted on the open ends of the tool support loop for rapid lateral entry of the tool into the tool support loop and securing of the tool.

Roesler et. al. U.S. Pat. No. 4,609,326 describes a gripping arrangement, particularly for manipulators, tool exchange devices and the like, has a housing, a guide provided in the housing, and two gripping fingers having gripping ends and moveable along the guide of the housing in a translatory reciprocating movement between a gripping position in which the gripping ends receive and hold an object therebetween and the gripping ends extend outwardly beyond the housing, and a releasing position in which the gripping ends release the object and gripping fingers are withdrawn substantially completely into and without projecting beyond the housing, the guide includes arcuate guiding tracks and guiding elements guided in and along the latter so that the movement of the gripping fingers includes a rectilinear component extending in a direction toward the object to be gripped and a transverse component extending transverse to the first component and in a direction toward the object to be gripped, whereby each of the gripping fingers during its movement from the releasing position toward the gripping position performs a rectilinear movement in a direction toward the object on which the transverse component directed toward the object is superposed, the gripping fingers have an axis therebetween and the arcuate guiding tracks are arranged symmetrically relative to the axis, and the gripping ends of the gripping fingers have inner sides and are provided at the inner sides with gripping surfaces which face toward the object in the gripping position and each has a portion embracing the object before its diametrical plane and a portion embracing the object after its diametrical plane.

Gallant, et. al. U.S. Pat. No. 5,195,667 describes a device for suspending T-shaped tools from a belt, toolbox, wall, or other mount, comprising a flat attachment material and a rotating holder body which secures the tool while allowing the tool to be inserted and removed from different angles. In order to ensure that the holder body stays in a useful position, its swing is limited by two stops which act as brakes and are affixed so as to protrude perpendicularly from the attachment material. The invention is designed so that after the tool is inserted into the holder, the head of the tool remains secured by the cantilevering action of a spring-loaded clip against a dead-lock arm extending downwards from the holder body. The opposite end of the tool rests on an L-shaped extending at right angles from the attachment material. The tool is removed by the natural motion of grasping the handle and swinging upwards. This results in the tool being held in an immediately usable manner as it is withdrawn from the holder.

Hopkins, et. al. U.S. Pat. No. 5,452,830 describes a holder for implements such as a mortal board, which is to be horizontally positioned, knives, such as broad, spackle, and shear knives, which are to be positioned at an angle, and a roll of drywall tape, vertically positioned. Holder comprises a back plate to secure implements, and a second plate in which the implement holder is temporarily attached to the user, more specifically, the waist area of the user. The mortar board is inserted into the Y-shaped slots which are horizontally aligned to the back plate and are disposed in spaced relationship. The knives are inserted into the compression loaded slots having adjacent relationship and positioned at an angle from the back plate. The tape is inserted into the J-shaped hook which is spaced away from the back plate to allow for the tapes positioning and removal to and from the implement holder. The parts which comprise the implement holder are made from a rigid material, preferably aluminum.

When the implements are engaged in their appropriate locations within the implement holder, both hands of the worker are free to conduct other operations.

Bebb et. al. U.S. Pat. No. 5,573,167 describes a method for using a holder having first and second clips arranged with their mouths facing substantially the same direction. The first clip is provided with an inner surface which is shaped to hold a cylindrical article and a mouth which is normally open so as to allow the legs of this first clip to be urged apart from each other when such a cylindrical article is pressed against it. The holder is mounted at a designated location on the user's body by attaching the second clip to a piece of material worn by the user, with the mouth of the first clip facing generally downwardly. A substantially cylindrical article is inserted into the first clip by placing the article against the mouth of this clip and lifting the article upwardly into contact with its inner surface, with the axis of the first clip's inner surface in a generally horizontal orientation. Preferably, the insertion of the article is performed by balancing it in one of the user's hands, placing the thumb of that hand on an upwardly facing surface of the holder and lifting the article into the first clip by pulling the article and thumb toward each other.

Hong, et. al. U.S. Pat. No. 5,820,333 describes a twin gripping apparatus for loading components comprised of two grippers, each composed of two pairs of fingers, disposed at an angle of predetermined value so that the components are held and carried to and from a work station. The two pairs of fingers perform simultaneously a carrying motion to and from a work station by gripping the components positioned at each work station by means of hydraulic pressure from air cylinders, and rotating to and from an angle of predetermined value.

Musarella, et al. U.S. Pat. No. 5,944,242 describes a tool holder for mounting on a user belt comprising a support member having two front supports and two rear supports, each rear support having a rear top portion, a rear bottom portion, and a rear transition portion positioned therebetween. Each front support is spaced from and biased substantially parallel to the rear top portion and being nonparallel to the rear bottom portion. Each rear transition portion extends toward the front support to provide a narrow gap which is smaller than the spacing between the front support and rear top portion, with the rear supports being connected by a support cross member, and the rear bottom portions extending away from the front supports. Also, the rear bottom portions are of substantially the same length as the rear top portions. A bracket member is operatively associated with the front supports for holding a tool. Thus, when the tool holder is mounted on a user belt, the front supports and rear transitions portions resistance to removal of the support member from the belt.

The prior art teaches various holding and gripping mechanisms, some of which have a locking component. Several of the locking mechanisms, however, apply to headed or T-shaped tools only such as hammers (Ramer, Gallant, Harvey). Other gripping mechanisms require that manipulators and tool exchange devices and the like be inserted or positioned horizontally (Roesler, Hopkins, Bebb), so that they are not practical for clamping in general purpose applications. The present invention overcomes the limitations of the prior art by providing smooth action clamping of a workpiece placed into the clamp jaws and provides easy opening via a manual lever.

SUMMARY OF THE INVENTION

The present invention teaches certain benefits in construction and use which give rise to the objectives described below.

A clamping apparatus comprises a base plate and integral thereto, a fixed clamping jaw and a pivotal support. A movable clamping jaw opposes the fixed clamping jaw and is pivotally engaged with the pivotal support, thereby being rotatable between an open jaw attitude and a closed jaw attitude. A motion inhibitor prevents a workpiece from pressing against the movable clamping jaw. An actuation lever enables moving the movable clamping jaw from the closed jaw attitude to the open jaw attitude and an actuation finger is positioned for receiving contact with the workpiece for moving the movable clamping jaw from the open jaw attitude to the closed jaw attitude. A bias spring is engaged with the movable clamping jaw and enabled for inhibiting motion of the movable clamping jaw from both the open and closed jaw attitudes. A single hand motion enables release of the clamp and gripping of the workpiece as it is lifted or falls from the clamp.

A primary objective of the present invention is to provide a tool holding and locking apparatus having advantages not taught by the prior art.

A further objective is to provide a means of automatically clamping a workpiece when the workpiece is inserted into the clamp housing.

A further objective is to provide a means for manually unclamping the workpiece with the same motion used to remove it from the clamp.

A still further objective is to provide such a clamping device with a release lever which enables simultaneous clamp release and gripping of the workpiece.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
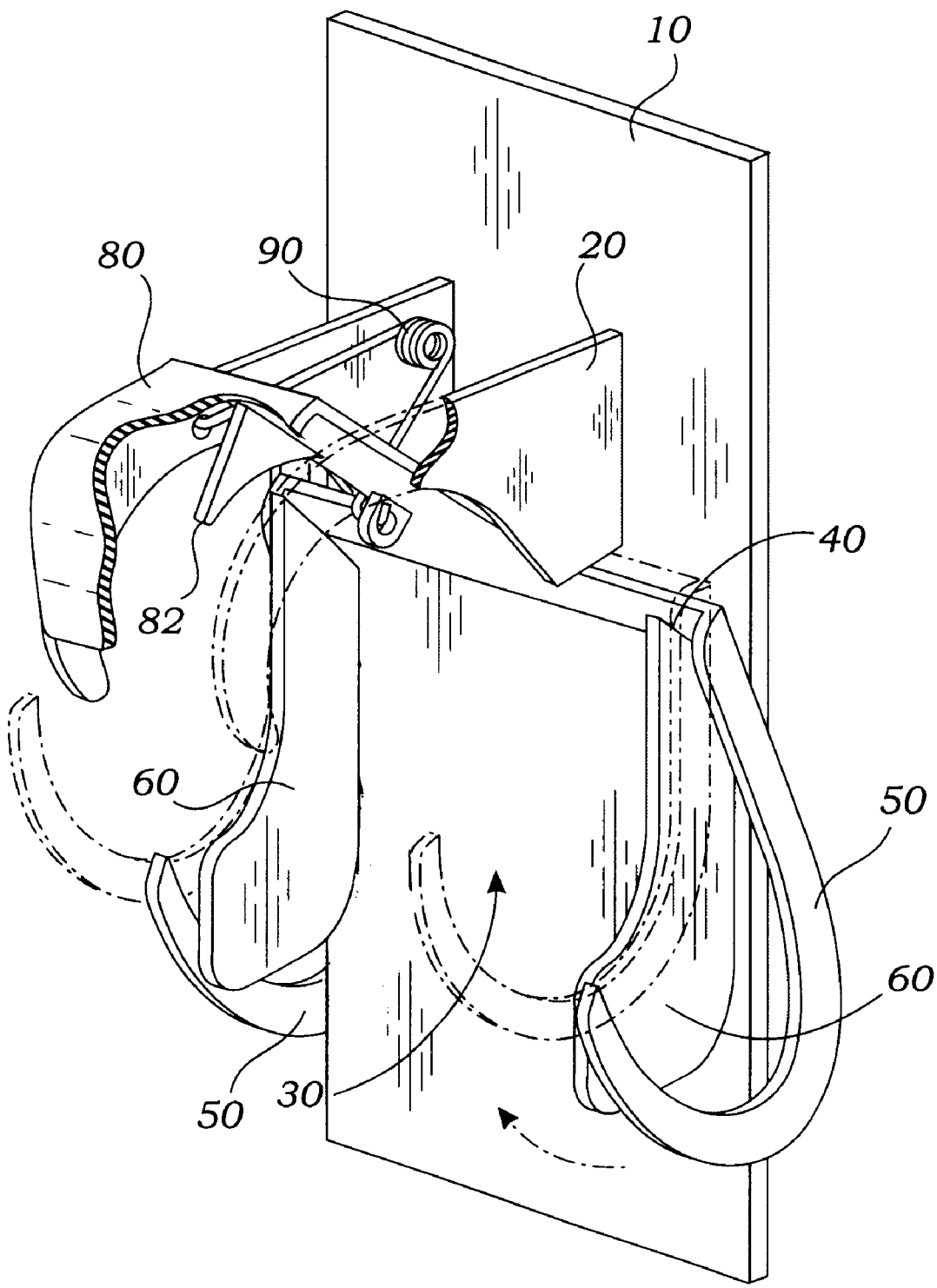
FIG. 1 is a perspective view of a first preferred embodiment of the present invention showing a clamping means in a clamp-open attitude in solid line and a clamp closed position in phantom line; portions of the invention are cut away to reveal important details.

The above described drawing figures illustrate the invention, a clamping apparatus comprising, a base plate 10 with an integral fixed clamping jaw 20 extending outwardly therefrom, the fixed clamping jaw 20 preferably arcuately curved about a workpiece position 30 proximate the base plate 10. Adjacent to the fixed clamping jaw 20 is a means for pivotal support 40 integral with the base plate 10 and extending outwardly therefrom. Such a means is preferably as shown in FIG. 1. A movable clamping jaw 50 is pivotally engaged with the means for pivotal support 40, as shown, so that it is rotatable between an open jaw attitude, shown in FIGS. 1 and 3 in solid line, and a closed jaw attitude shown in FIG. 2. The movable clamping jaw 50 is preferably arcuately curved about the workpiece position 30 in opposing juxtaposition to the fixed clamping jaw 20. At least one fixed resting plate 60 is integral with the base plate 10 and extending outwardly therefrom and positioned adjacent to the movable clamping jaw 50, such that a workpiece 70 clamped within the apparatus and tending to move against the movable clamping jaw 50 is inhibited therefrom by the at least one fixed resting plate 60. An actuation lever 80 is integral with the movable clamping jaw 50 and positioned adjacent the base plate 10 with the movable clamping jaw 50 in the closed jaw attitude, and is positioned away from the base plate 10 with the movable clamping jaw in the open jaw attitude (FIGS. 1 and 3). The actuation lever 80 provides an integral actuation finger 82 protruding into the workpiece position 30 with the movable clamping jaw 50 in the open jaw attitude for contact with the workpiece 70 for closing the movable clamping jaw 50. A bias spring 90 is engaged with the movable clamping jaw 50, the bias spring 90 enabled for urging the movable clamping jaw 50 into the open jaw attitude when the movable clamping jaw 50 is in the open jaw attitude, and further enabled for urging the movable clamping jaw 50 into the closed jaw attitude when the movable clamping jaw 50 is in the closed jaw attitude.

Figure 2:
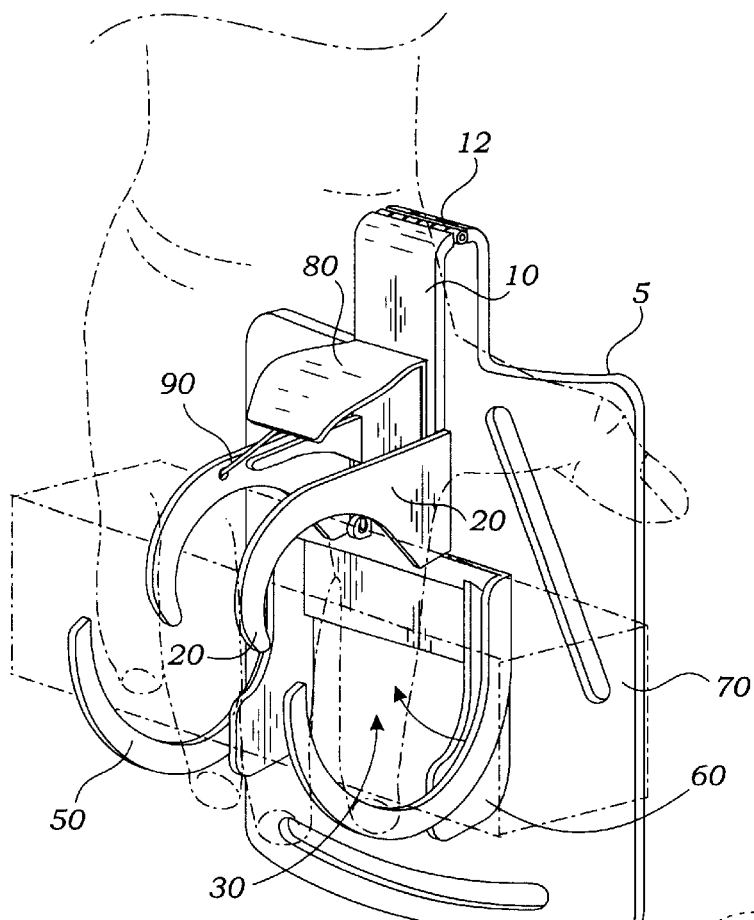
FIG. 2 is a perspective view of a second preferred embodiment thereof with the clamping means in a clamp-closed attitude and showing a hand moving to release a clamped workpiece.
Figure 3:
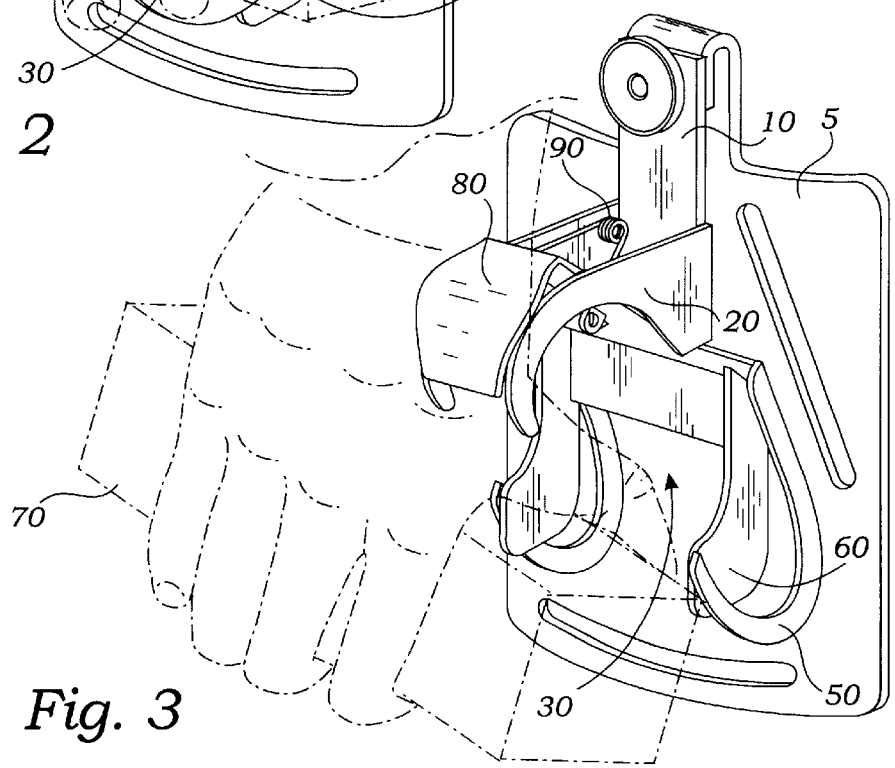
FIG. 3 is similar to FIG. 2 showing the workpiece being taken from the open clamp in the same motion used for opening the clamp.

It is seen in FIG. 2 that the base plate 10 may be joined and engaged with a means for mounting 5 by a hinge 12 which enables the mounting means 5 to be placed into a pocket or on a belt while allowing the base plate 10 to move with working motion as necessary.

It is seen in FIGS. 2 and 3 that the actuation lever 80 is positioned and adapted for moving the movable clamping jaw 50 from the closed jaw attitude to the open jaw attitude with a hand movement simultaneously placing the hand in position for receiving the workpiece. This is illustrated in FIG. 2 as the hand is positioned for pressing down on the actuation lever 80, and in FIG. 3 where the hand has already actuated the clamp into its open position and is receiving the workpiece 70. The workpiece 70 and the hand are shown with phantom lines.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A clamping apparatus comprising: a base plate; a fixed clamping jaw integral with the base plate and extending outwardly therefrom, the fixed clamping jaw arcuately curved about a workpiece position proximate the base plate; adjacent the fixed clamping jaw, a means for pivotal support integral with the base plate and extending outwardly therefrom; a movable clamping jaw pivotally engaging the means for pivotal support, thereby rotatable between an open jaw attitude and a closed jaw attitude, the movable clamping jaw arcuately curved about the workpiece position, in opposing juxtaposition to the fixed clamping jaw; at least one fixed resting plate integral with the base plate and extending outwardly therefrom and positioned adjacent the movable clamping jaw, such that a workpiece clamped within the apparatus and tending to move against the movable clamping jaw is inhibited therefrom by the at least one fixed resting plate; an actuation lever integral with the movable clamping jaw and positioned adjacent the base plate with the movable clamping jaw in the closed jaw attitude, and positioned away from the base plate with the movable clamping jaw in the open jaw attitude, the actuation lever providing an integral actuation finger protruding into the workpiece position with the movable clamping jaw in the open jaw attitude for contact with the workpiece for closing the movable clamping jaw; a bias spring engaged with the movable clamping jaw, the bias spring enabled for urging the clamping jaw into the open jaw attitude when the movable clamping jaw is in the open jaw attitude, and further enabled for urging the movable clamping jaw into the closed jaw attitude when the movable clamping jaw is in the closed jaw attitude.

2. The apparatus of claim 1 wherein the base plate is engaged with a means for mounting by a hinge.

3. The apparatus of claim 1 wherein the actuation lever is positioned and adapted for moving the movable clamping jaw from the closed jaw attitude to the open jaw attitude with a hand movement simultaneously placing the hand in position for receiving the workpiece.

4. A clamping apparatus comprising: a base plate and integral thereto, a fixed clamping jaw and a means for pivotal support; a movable clamping jaw opposing the fixed clamping jaw and pivotally engaging the means for pivotal support, thereby rotatable between an open jaw attitude and a closed jaw attitude; further integral with the base plate, a means for inhibiting workpiece motion such that a workpiece clamped within the jaws and tending to move against the movable clamping jaw is inhibited therefrom by contact with the motion inhibiting means; an actuation lever rigidly integral with, and enabled for moving the movable clamping jaw from the closed jaw attitude to the open jaw attitude; the actuation lever providing an integral actuation finger positioned for receiving contact with the workpiece for moving the movable clamping jaw from the open jaw attitude to the closed jaw attitude; a bias spring engaged with the movable clamping jaw and enabled for inhibiting motion thereof from both the open and closed jaw attitudes.

5. The apparatus of claim 4 wherein the base plate is engaged with a means for mounting by a hinge.

6. The apparatus of claim 4 wherein the actuation lever is positioned and adapted for moving the movable clamping jaw from the closed jaw attitude to the open jaw attitude with a hand movement simultaneously placing the hand in position for receiving the workpiece.

7. A clamping apparatus comprising: a base plate and integral thereto, a fixed clamping jaw and a means for pivotal support; a movable clamping jaw opposing the fixed clamping jaw and pivotally engaging the means for pivotal support, thereby rotatable between an open jaw attitude and a closed jaw attitude; further integral with the base plate, a means for inhibiting workpiece motion such that a workpiece clamped within the jaws and tending to move against the movable clamping jaw is inhibited therefrom by contact with the motion inhibiting means; an actuation lever rigidly integral with, and enabled for moving the movable clumping jaw from the closed jaw attitude to the open jaw attitude; the actuation lever providing an integral actuation finger positioned for receiving contact with the workpiece for moving the movable clamping jaw from the open jaw attitude to the closed jaw attitude; a bias spring engaged with the movable clamping jaw and enabled for inhibiting motion thereof from both the open and closed jaw attitudes; the base plate further providing a means for belt mounting of the apparatus, the belt mounting means providing a flat plate having two linear spaced apart opposing slots therein, the slots positioned such that an upper ends of the slots are positioned more distantly apart then a lower ends of the slots.

8. The apparatus of claim 7 wherein the base plate is hingably engaged with the means for belt mounting.

9. The apparatus of claim 7 wherein the actuation lever is positioned and adapted for moving the movable clamping jaw from the closed jaw attitude to the open jaw attitude with a hand movement simultaneously placing the band in position for receiving the workpiece.

* * * * *